United States Patent
Feyh et al.

(10) Patent No.: US 9,677,950 B2
(45) Date of Patent: Jun. 13, 2017

(54) PORTABLE DEVICE WITH TEMPERATURE SENSING

(71) Applicant: Robert Bosch GmbH, Stuttgart (DE)

(72) Inventors: Ando Lars Feyh, Palo Alto, CA (US);
Po-Jui Chen, Cupertino, CA (US);
Gary Yama, Mountain View, CA (US);
Fabian Purkl, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 14/203,346

(22) Filed: Mar. 10, 2014

(65) Prior Publication Data
US 2014/0269827 A1    Sep. 18, 2014

Related U.S. Application Data

(60) Provisional application No. 61/781,115, filed on Mar. 14, 2013.

(51) Int. Cl.
*G01K 1/14*    (2006.01)
*G01K 13/00*   (2006.01)
(Continued)

(52) U.S. Cl.
CPC ............ *G01K 13/00* (2013.01); *G01J 5/0205* (2013.01); *G01J 5/025* (2013.01); *G01J 5/0265* (2013.01); *G01J 5/0806* (2013.01); *G01J 5/089* (2013.01); *G01J 5/0859* (2013.01); *G01J 5/20* (2013.01); *G01K 1/02* (2013.01); *G01J 2005/0077* (2013.01); *G01K 2211/00* (2013.01); *G01K 2213/00* (2013.01)

(58) Field of Classification Search
None
See application file for complete search history.

(56) References Cited

U.S. PATENT DOCUMENTS

| 6,379,988 B1 | 4/2002 | Peterson et al. |
|---|---|---|
| 6,401,545 B1 | 6/2002 | Monk et al. |

(Continued)

FOREIGN PATENT DOCUMENTS

WO    2012067423 A2    5/2012

OTHER PUBLICATIONS

International Search Report and Written Opinion corresponding to PCT Application No. PCT/US2014/024290, mailed Jul. 18, 2014 (9 pages).

(Continued)

*Primary Examiner* — Erica Lin
(74) *Attorney, Agent, or Firm* — Maginot Moore & Beck LLP (57) ABSTRACT

In one embodiment, a portable temperature sensing system includes a portable housing configured to be carried by a user, a microelectrical mechanical system (MEMS) thermal sensor assembly supported by the housing and including an array of thermal sensor elements, a memory including program instructions, and a processor operably connected to the memory and to the sensor, and configured to execute the program instructions to obtain signals from each of a selected set of thermal sensor elements of the array of thermal sensor elements, determine an average sensed temperature based upon the signals, and render data associated with the determined average sensed temperature.

20 Claims, 7 Drawing Sheets

(51) Int. Cl.
*G01K 1/08* (2006.01)
*G01K 1/02* (2006.01)
*G01J 5/08* (2006.01)
*G01J 5/02* (2006.01)
*G01J 5/20* (2006.01)
*G01J 5/00* (2006.01)

(56) References Cited

U.S. PATENT DOCUMENTS

| | | | |
|---|---|---|---|
| 6,766,998 | B2 | 7/2004 | Silverbrook |
| 6,861,633 | B2 | 3/2005 | Osborn |
| 6,965,349 | B2 | 11/2005 | Livingston et al. |
| 7,199,438 | B2 | 4/2007 | Appelt et al. |
| 8,275,413 | B1* | 9/2012 | Fraden .............. H04M 1/72522 455/344 |
| 2002/0070464 | A1 | 6/2002 | Frezza |
| 2002/0090749 | A1 | 7/2002 | Simmons |
| 2002/0143257 | A1 | 10/2002 | Newman et al. |
| 2004/0021770 | A1 | 2/2004 | Krill |
| 2005/0152015 | A1* | 7/2005 | Anderson .............. G02B 7/008 345/211 |
| 2006/0161074 | A1 | 7/2006 | Liao |
| 2007/0034800 | A1* | 2/2007 | Huang .................... H04N 5/33 250/338.3 |
| 2008/0007641 | A1 | 1/2008 | Pahr et al. |
| 2009/0105605 | A1 | 4/2009 | Abreu |
| 2009/0115008 | A1 | 5/2009 | Ziglioli et al. |
| 2009/0121137 | A1* | 5/2009 | Liddiard ................... G01J 5/20 250/338.1 |
| 2010/0130140 | A1* | 5/2010 | Waku ..................... H01Q 1/243 455/77 |
| 2011/0007167 | A1 | 1/2011 | Katake et al. |
| 2011/0092009 | A1 | 4/2011 | Ziglioli et al. |
| 2011/0096482 | A1* | 4/2011 | Yano ..................... H04M 1/185 361/679.01 |

OTHER PUBLICATIONS

Gilleo, "Newest Micropackaging Concepts Including MEMS & Photonics," ET-Trends, LLC, USA (39 pages).
Gilleo, "MEMS & MOEMS Packaging Challenges," Jan. 2001; http://www.et-trends.com/files/ASU-MEMS_moems.PDF, USA (23 ages).
Gilleo, "MEMS Packaging Issues and Materials," Research Paper, Cookson Electronics, USA (7 pages).
Maus et al., "A Hermetic Advanced Packaging Solution for Optical Devices Using a Glass-Capping Technology on Wafer-Level," Proceedings of the Eurosensors XXIII Conference, 2009, pp. 1527-1530, Elsevier, Germany (4 pages).
Monnini et al., "System on Chip Development for attitude sensors," downloaded from ftp://ftp/elet.polimi.it/users/Marco.Lovera/ESAGNC08/S05/03_Monnini.pdf, pp. 1-14, Europe (14 pages).
Samann et al., "Predictive Centroiding for Star Trackers with the Effect of Image Smear," The Journal of the Astronautical Sciences, 2002, pp. 113-123, vol. 50, No. 1, USA (11 pages).
Seidemann et al., "Wafer-Level Glass Capping as Drop-in for Miniaturized, Advanced Optical COB Packaging," Electronic Components and Technology Conference, 2007, pp. 600-604, USA (5 pages).
Soref et al., "Longwave plasmonics on doped silicon and silicides," Optics Express, 2007, vol. 16, No. 9, USA (8 pages).
Williams, "Packaging for MEMS," UC Extension MEMS Course, Science Applications International Corporation (SAIC), © 2010 Kirt Williams, USA (15 pages).

* cited by examiner

PORTABLE DEVICE WITH TEMPERATURE SENSING

This application claims the benefit of U.S. Provisional Application No. 61/781,115 filed Mar. 14, 2013, the entirety of which is incorporated herein by reference.

FIELD

The present disclosure relates generally to portable devices and more particularly to portable devices incorporating microelectrical mechanical systems (MEMS).

BACKGROUND

Portable electronic devices such as cellular telephones are ubiquitous in many societies. The rise in popularity of portable electronic devices can be attributed, at least in part, to the ever-lowering expense of the devices. In many instances, such as smart-phones, the popularity of the devices is further attributable to the ever-increasing functionality of the devices. For example, telephones commonly include cameras, GPS receivers, and a number of applications many of which bear little relationship to a communications system.

While many of the functionalities may provide only entertainment value, some functionalities are more practical. Incorporation of a GPS receiver, for example, when combined with a web browser application allows an individual to virtually instantly obtain directions to a location of interest.

Although a wide variety of applications and functionalities are provided in mobile devices, additional capabilities are desirable. By way of example, mobile devices can be used to obtain weather information, including near-real-time radar of the area in which a user is located. Thus, a user can determine that a front is approaching, that rain is expected, and that temperatures will be falling below freezing. The actual temperature in the vicinity of the user can also be obtained. Even with all of that information, however, the user cannot be sure if a wet-looking pavement is simply damp or is covered with so-called "black ice" since pavement may be below freezing while the air temperature is above freezing.

What is needed is a system that can be used to determine the temperature of an object. A system which is portable and capable of obtaining the required data using easily implemented fabrication processes would be beneficial.

SUMMARY

In one embodiment, a portable temperature sensing system includes a portable housing configured to be carried by a user, a microelectrical mechanical system (MEMS) thermal sensor assembly supported by the housing and including an array of thermal sensor elements, a memory including program instructions, and a processor operably connected to the memory and to the sensor, and configured to execute the program instructions to obtain signals from each of a selected set of thermal sensor elements of the array of thermal sensor elements, determine an average sensed temperature based upon the signals, and render data associated with the determined average sensed temperature.

The above described features and advantages, as well as others, will become more readily apparent to those of ordinary skill in the art by reference to the following detailed description and accompanying drawings.

DETAILED DESCRIPTION

Figures 1, 2:
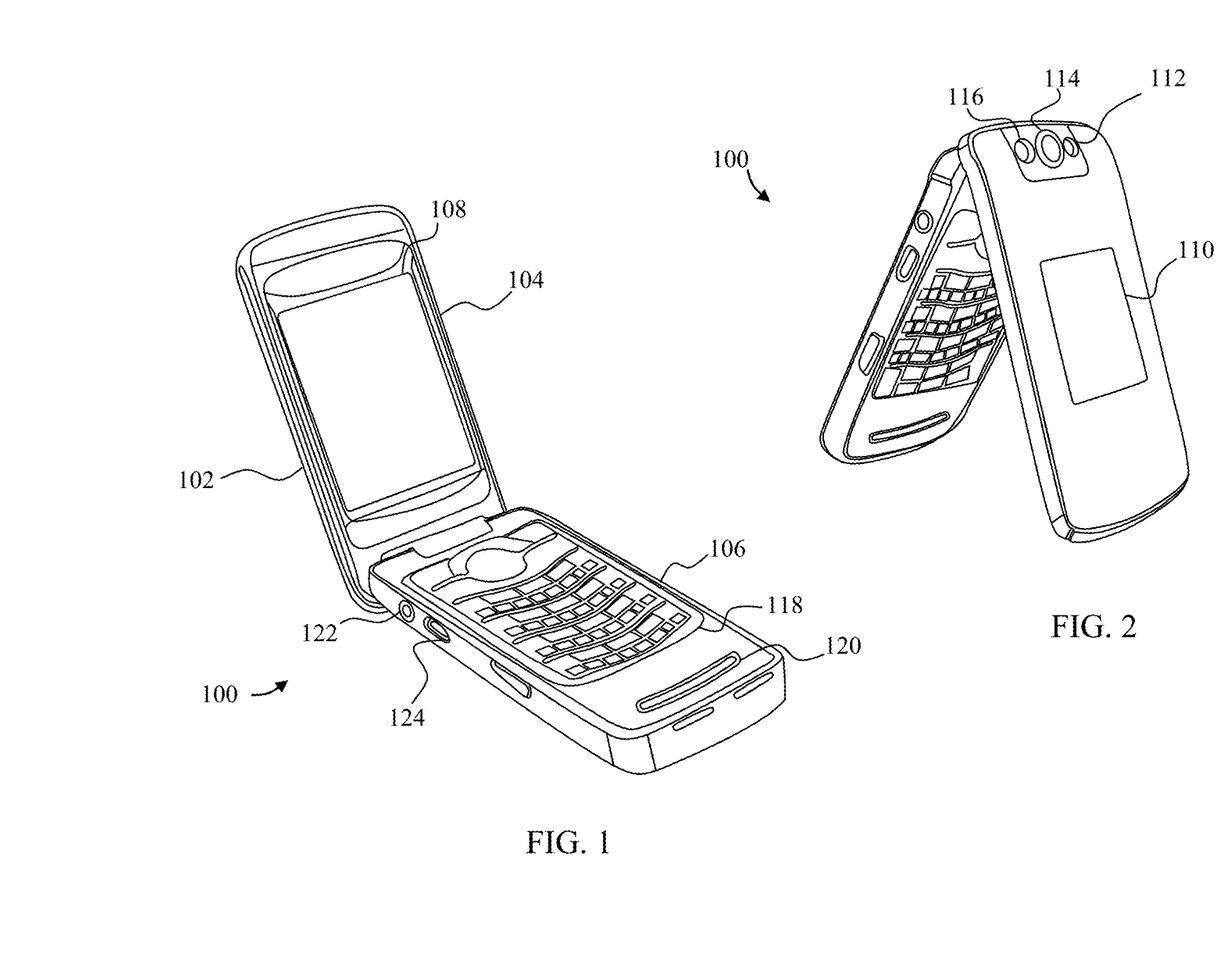
FIGS. 1 and 2 depict perspective views of one embodiment of a portable device in which the subject disclosure is used.

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains Referring to FIG. 1, there is depicted a portable device, generally designated 100, which in this embodiment is a cellular telephone. The portable device 100 has a housing 102 that includes an upper housing portion 104 and a lower housing portion 106. An inner display 108 is located on the inner side of the upper housing portion 104 and an outer display 110 is located on the outer side of the upper housing portion 104 as depicted in FIG. 2. The outer side of the upper housing portion 104 further includes a microelectrical mechanical system (MEMS) thermal sensor assembly port 112, a camera port 114 and a light port 116.

Referring again to FIG. 1, the lower housing portion 106 includes a keyboard 118 and a microphone port 120. A data port 122 and a charging port 124 are located on the side of the lower housing portion 106.

Figure 3:
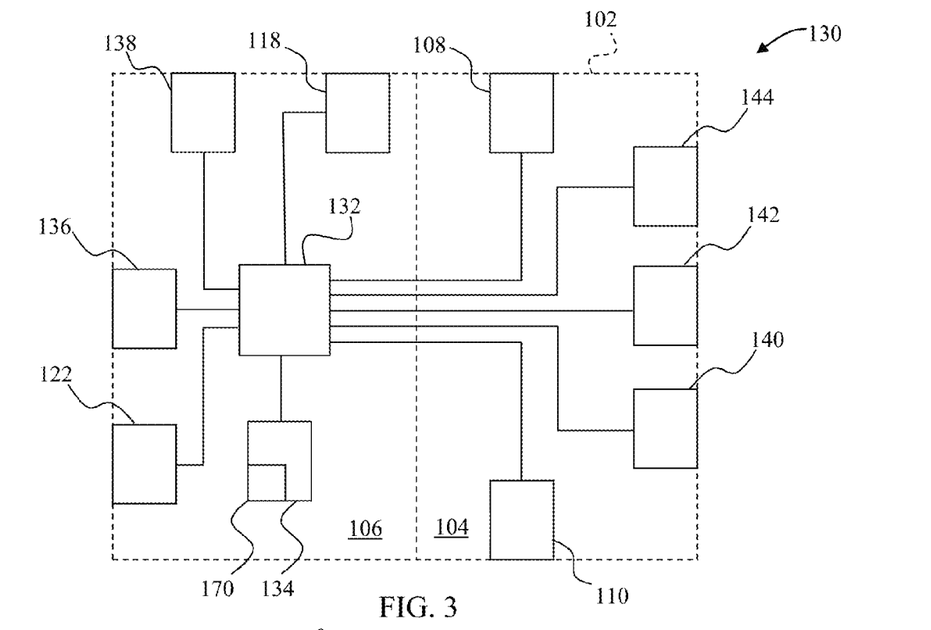
FIG. 3 depicts a block diagram of the components of the portable device of FIG. 1.

FIG. 3 depicts a control circuit 130 which is located within the housing 102. The control circuit 130 includes a processor 132 and a memory 134 which in this embodiment are located within the lower housing portion 106. The processor 132 is operably connected to the keyboard 118 and the data port 122. The processor 132 is further operably connected to a power source 136 which is accessed through the charging port 124 and a microphone 138 positioned adjacent to the microphone port 120.

The processor 132 is also operably connected to components in the upper hosing portion 104 including the inner display 108 and the outer display 110. The processor 132 is further operably connected to a microelectrical mechanical system (MEMS) thermal sensor assembly 140, a charge coupling device (CCD) 142 and a light 144 which are physically located adjacent to the MEMS thermal sensor assembly port 112, the camera port 114 and the light port 116, respectively.

Figure 4:
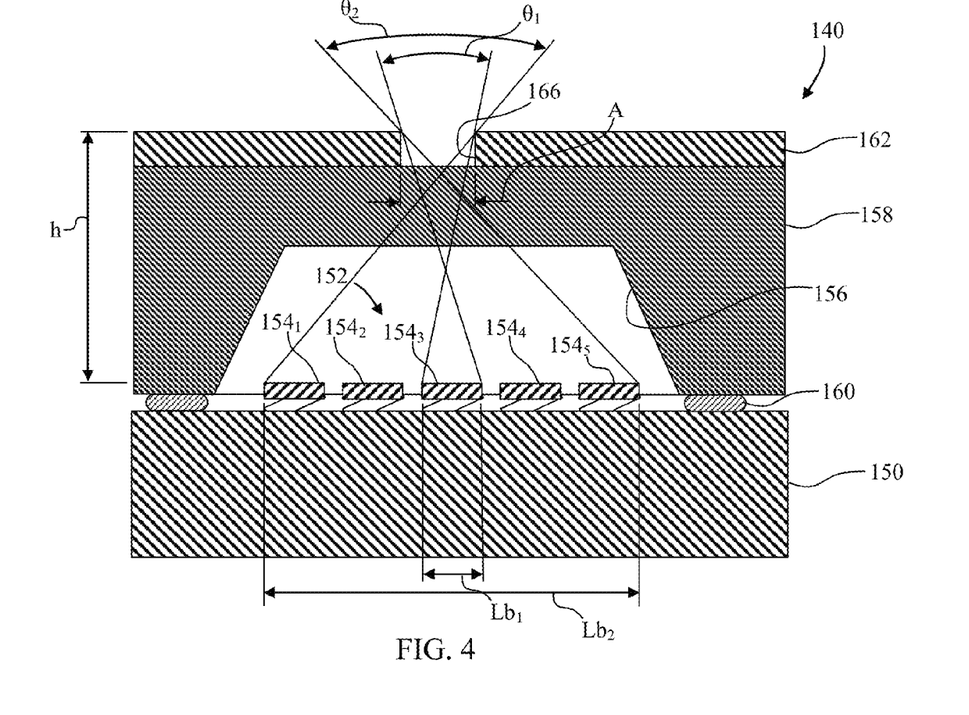
FIG. 4 depicts a side cross-sectional view of the MEMS thermal sensor assembly of FIG. 3.

The MEMS thermal sensor assembly 140 is shown in further detail in FIG. 4. The MEMS thermal sensor assembly 140 includes a substrate 150 and an array 152 of thermal sensors $154_{1-5}$. In some embodiments, the array 152 is a single pixel. The array 152 is located within a chamber 156 defined in part by a cap 158 which is bonded to the substrate 150 with a hermetic seal 160. A thin metallic film 162 is deposited on an outer surface 164 of the cap 158. The thin metallic film 162 defines a lens 166. The thermal sensors $154_{1-5}$ in one embodiment are formed using the teaching of U.S. Pat. No. 7,842,533 which issued Nov. 30, 2010, the entire contents of which are herein incorporated by reference.

Within the memory 134 are stored program instructions 170. The program instructions 170, which are described more fully below, are executable by the processor 132 and/or any other components as appropriate. The program instructions 170 include commands which, when executed by the processor 132, cause the portable device 100 to obtain data for use in determining the temperature of an object within a field of view of the MEMS thermal sensor assembly 140.

Figure 5:
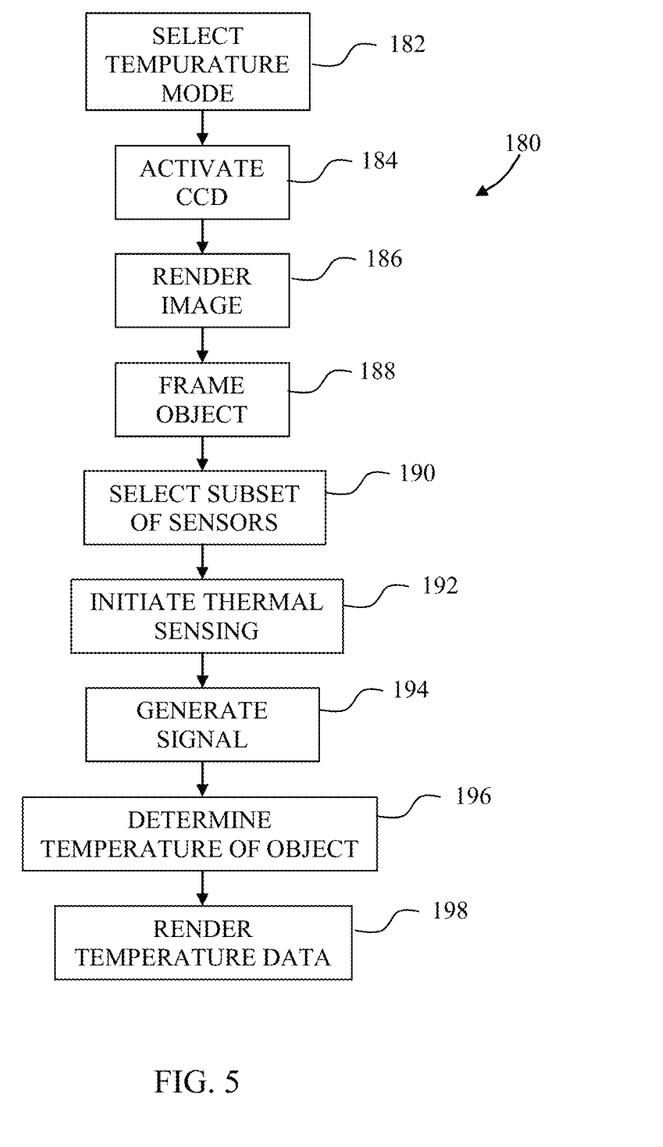
FIG. 5 depicts a procedure for obtaining data for determining the temperature of an object using the portable device of FIGS. 1 and 2.

Referring to FIG. 5, there is depicted a flowchart or a process, generally designated 180, setting forth an exemplary manner of obtaining data for use in determining the temperature of an object within a field of view of the MEMS thermal sensor assembly 140 by executing the program instructions 170 according to the present principles. Initially, a user carrying the portable device 100 opens the housing 102 to the position shown in FIG. 1 and uses the keyboard 118 to place the portable device 100 in temperature detection mode (block 182). In embodiments which are configured solely for temperature detection, the device may only need to be energized. In embodiments such as the portable device 100, the display 108 in some embodiments is configured to render a menu which the user uses to activate the temperature detection mode.

Once the portable device 100 is placed in temperature detection mode, the processor 132 controls the CCD 142 to an energized condition (block 184). In response, the CCD 142 begins to detect incoming energy in any acceptable manner and generates a signal indicative of the sensed energy. The processor 132 receives the generated signal and controls the inner display 108 to render the scene viewed (sensed) by the CCD 142 (block 186).

Using the rendered image as a guide, the user frames the desired scene/object (block 188). Framing of the object in some embodiments is accomplished by zooming the display such that the object fills the display 108. In other embodiments, a shadow frame overlying the viewed scene is manipulated to frame the object. As the object is framed using the inner display 108, the processor 132 selects a subset of the thermal sensors $154_{1-5}$ in the array 152. By varying the number of active pixels (each of the thermal sensors $154_{1-5}$ is a separate pixel), the field of view (FOV) of the MEMS thermal sensor assembly 140 is adjusted to comport with the framing of the object in the display 108 (block 190).

More specifically, by varying the number of active pixels the active base-length (Lb) of the array 152 is varied as discussed with reference to FIG. 4. As depicted in FIG. 4, the aperture of the lens 166 is located at a distance (h) from the thermal sensors $154_{1-5}$, and the aperture opening (diameter) is defined as "A". If only thermal sensor $154_3$ is selected, the resulting FOV is defined as the angle $\theta_1$ with a short active base length ($Lb_1$). By selecting additional thermal sensors $154_x$, e.g. subset of thermal sensors including thermal sensors $154_{1-5}$, the FOV is expanded to $\theta_2$ with a correspondingly longer active base length ($Lb_2$).

The FOV (neglecting diffraction) is approximated as $\tan(a/2)=(Lb/2+A/2)/h$. In one embodiment, "h" is about 200-500 microns, "A" is about 50-100 microns, and "Lb" is adjustable between about 15 microns and 1000 microns. Consequently, values for "θ" are between 1 and 150 degrees, depending on the defined values. For A of 50 micron, h of 300 micron, and Lb between 20 and 200 micron, θ is adjustable between angles of 13 and 45 degrees. Therefore the sensing area of the array 152 can be adjusted in order to have a smaller or larger area of detection at a given distance.

Once the object is framed and the subset of thermal sensors $154_{1-5}$ is selected, the user initiates thermal data acquisition (block 192) such as by pressing a key in the keyboard 118. In response, the processor 132 controls the MEMS array 152 to generate a respective signal from each of the selected thermal sensors $154_{1-5}$ (block 194).

The processor 132 then determines a temperature for the object based upon the generated signals (block 196) and controls the display 108 to render temperature data associated with the determined temperature (block 198). In some embodiments, the average temperature data is displayed on the display.

Figure 6:
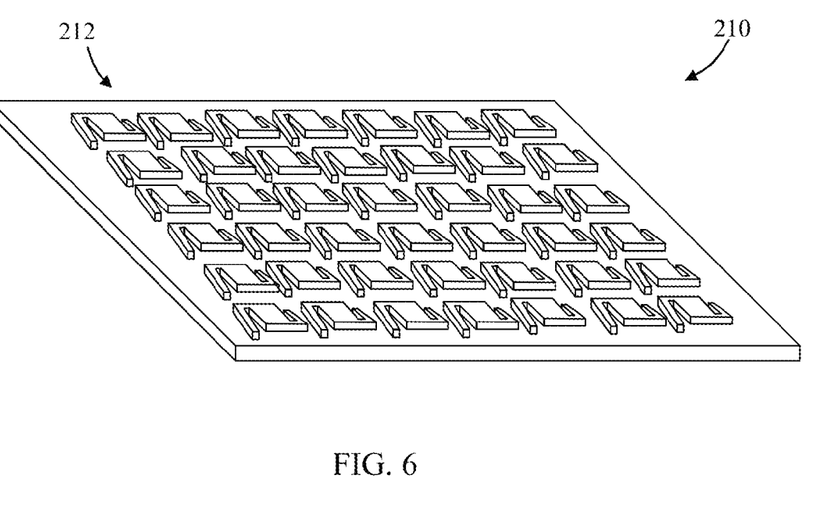
FIG. 6 depicts a top perspective view of a rectangular array of thermal sensors that is included in the device of FIGS. 1 and 2 in some embodiments.
Figure 7:
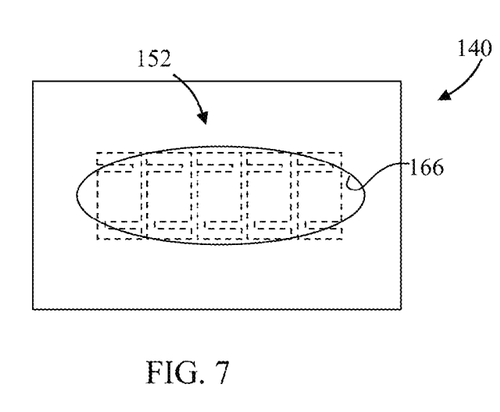
FIG. 7 depicts a top plan view of the device of FIG. 4 illustrating an oblong lens.

In different embodiments, the MEMS thermal sensor assembly 140 and/or the process 180 are modified. By way of example, in the embodiment of FIG. 4, the array 152 is a linear array of thermal sensors. FIG. 6 depicts a portion of a MEMS thermal sensor assembly 210 which includes an array 212 which is in the form of a rectangle. Modification of the layout of the array 212 is particularly advantageous when combined with a modification of the shape of the aperture in a particular embodiment. By way of example, the lens 166 which is used with the linear array 152 of FIG. 4 is oblong as shown in FIG. 7. In another embodiment, the oblong lens 166 is replaced with a rectangular lens (not shown). The rectangular array 212 of the assembly 210 in one embodiment is combined with a substantially rectangular lens 214 (see FIG. 8).

Figure 9:
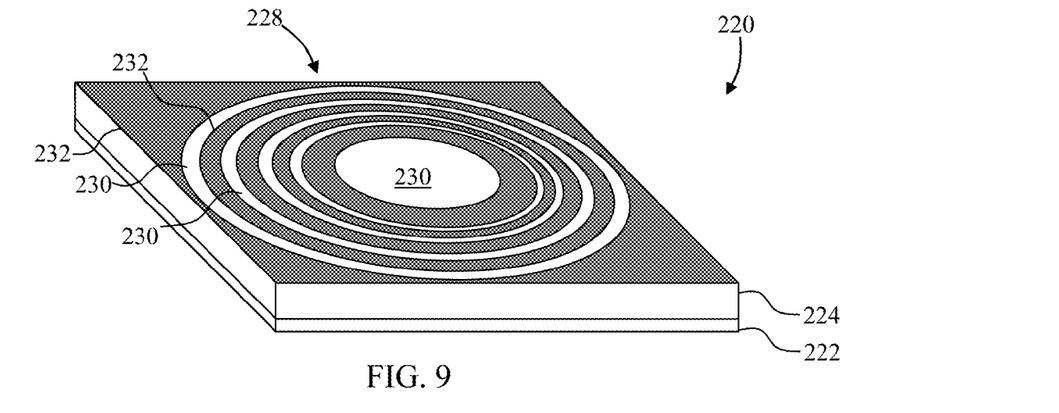
FIG. 9 depicts a top perspective view of a MEMS thermal sensor assembly incorporating a Fresnel lens on an outer surface of the cap of the assembly.
Figure 10:
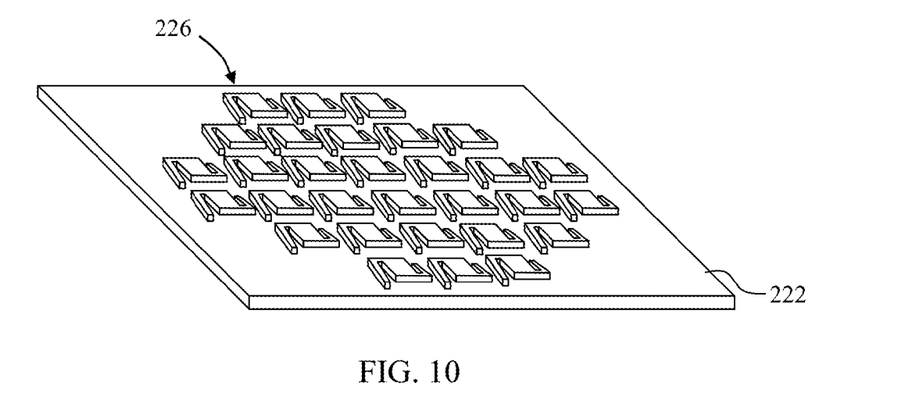
FIG. 10 is a top perspective view of the MEMS thermal sensor assembly of FIG. 9 with the cap removed.

In other embodiments, square arrays and square lenses are used. Circular lenses are also used in some embodiments. The circular lens in some of the embodiments is formed using a thin metallic layer similar to the film 162. One embodiment of an assembly with a circular lens is depicted in FIG. 9. The MEMS thermal sensor assembly 220 of FIG. 9 is similar to the MEMS thermal sensor assembly 140 of FIG. 4, including a base portion 222 and a cap 224 which forms an environmentally controlled chamber for an array 226 (see FIG. 10). The array 226, however, is substantially circular as opposed to the linear array 152. Additionally, the cap 224 includes a Fresnel lens 228 which is composed of a series of concentric thermally transparent circles 230 alternating with thermally opaque areas 232. The lens 228 focuses incoming infrared energy onto the array 226.

The Fresnel lens 228 is formed in some embodiments by deposition and patterning of materials not transmissive to infrared light (e.g., metal, polymers, etc.). The materials in some embodiments are deposited onto the cap 224, in some embodiments grooves are simply formed in the cap 223, and in other embodiments the areas 232 are formed by implantation of high doses of ions such as Ph, As, or B. In other embodiments, a silicide is formed with the desired pattern.

Figure 11:
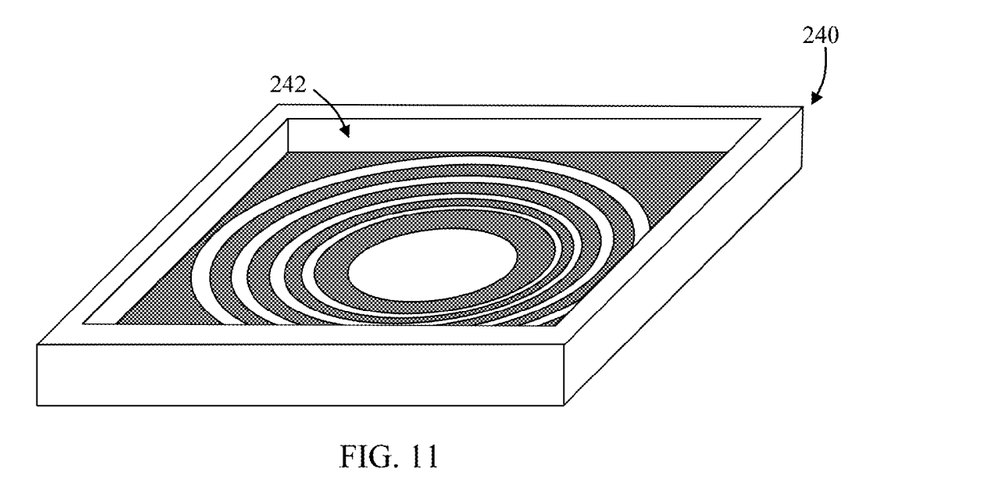
FIG. 11 is a bottom perspective view of a cap with a Fresnel lens on an inner surface of the cap which can be used in place of the caps of FIGS. 4 and 9.

While the lens 228 is formed on an outer surface of the cap 228, the lens in some embodiments is formed on an inner surface of the cap. FIG. 11 depicts a cap 240 with a Fresnel lens 242 formed on an inner surface of the cap 240.

In addition to the shape of the lens, the size of the lens is modified in different embodiments to provide the desired operating characteristics. For example, smaller apertures are used in order to provide small FOV with small overall footprint. Diffraction is typically not a limiting factor in small aperture configurations, especially for temperature sensing or gas sensing applications. Consequently, the size of the aperture is reduced in some applications such that the first diffraction maximum is just broad enough to cover the array. In some applications this results in an aperture of 5 microns in diameter while IR wavelengths for temperature sensing are in the range of 5-15 microns.

As noted above, the process 180 in some embodiments is modified from the description provided above. In one embodiment, the final selection of the subset of thermal sensor pixels used in generating a temperature of an object is based upon the received signal from each of the thermal sensor pixels in an initially selected subset of thermal sensor pixels. This is explained with initial reference to FIG. 12.

Figure 12:
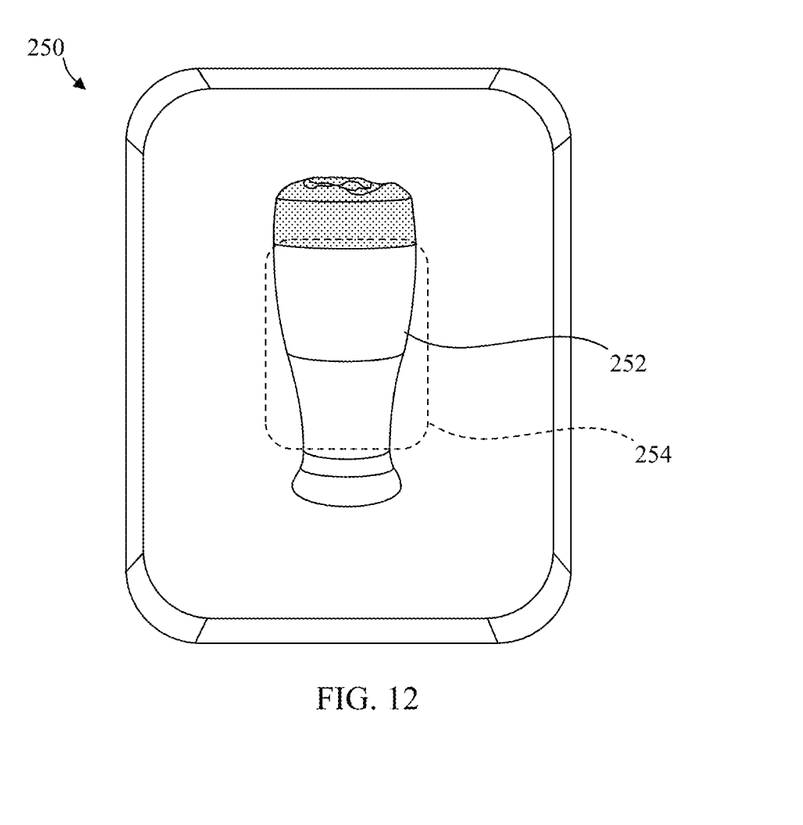
FIG. 12 depicts a display similar to the display of the device of FIGS. 1 and 2 with an object which has been framed by a user in order to ascertain the temperature of the object.
Figure 13:
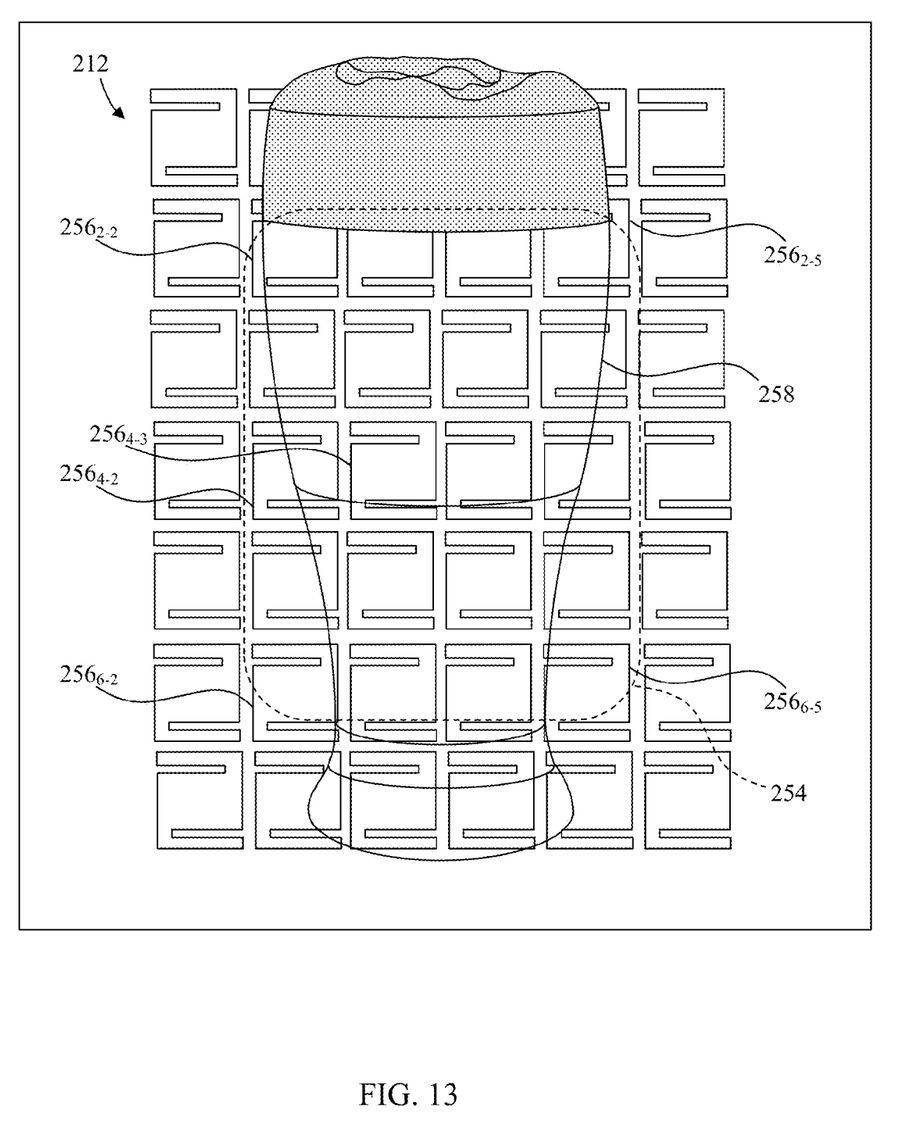
FIG. 13 depicts the thermal sensor array associated with the display of FIG. 12 showing the image of the object displayed in FIG. 12 as formed by the lens of the device and focused upon the thermal sensor array.

FIG. 12 depicts a display 250 which in some embodiments is similar to the display 108. Within the display 250, a user has framed a portion of an object 252 (see, e.g., block 188 of FIG. 5) using a shadow frame 254. The display 250 is used, in this example, with the array 212 of FIG. 8. Accordingly, when the object 252 is framed as depicted in FIG. 12, the controller 132 initially selects a subset of thermal sensors $256_{x-y}$ wherein "x" indicates the row in which a thermal sensor 256 is located and "y" indicates the column in which a thermal sensor 256 is located as depicted in FIG. 13. The subset of selected thermal sensors 256 in FIG. 13 are thus bounded by thermal sensors $256_{2-2}$ (top left of selected subset), $256_{2-5}$ (top right of selected subset), $256_{6-2}$ (bottom left of selected subset), and $256_{6-5}$ (bottom right of selected subset).

Figure 8:
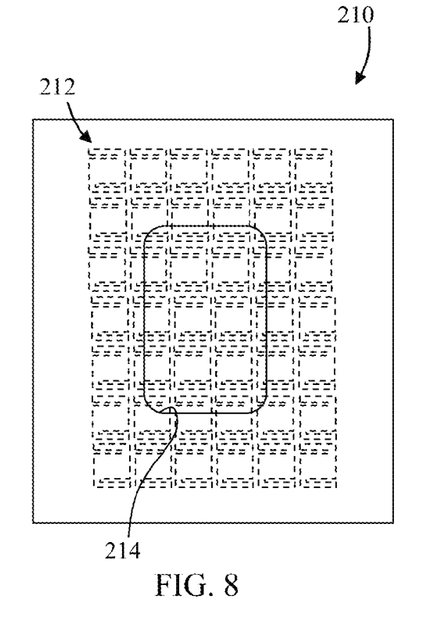
FIG. 8 depicts a top plan view of a MEMS thermal sensor assembly incorporating the rectangular array of FIG. 6.

For purpose of description, the image 258 of the object 252 is also shown as it is focused on the array 212 by the associated lens 214 (see FIG. 8). As evidenced by FIG. 13 wherein the image 258 does not overlie each of the subset of initially selected thermal sensors, not all of the pixels within the FOV of the array 212 (i.e., the subset of initially selected thermal sensors) receive the same amount of energy from the object 252. For example, fourteen of the thermal sensors 256 (e.g., thermal sensor $256_{4-3}$) will generate signals which are more accurate indications of the temperature of the object 252. Two of the thermal sensors 256 (e.g., thermal sensor $256_{4-2}$) will be partially illuminated by the object 252, and four of the thermal sensors 256 (e.g., thermal sensor $256_{6-2}$) are only slightly illuminated or not illuminated at all by the object 252.

Consequently, when the signals are generated by the subset of initially selected thermal sensors (block 194 of FIG. 5) and passed to the processor 132, the signals received from fourteen of the sensors 256 will be associated with a temperature that is at or about the actual temperature of the object 252. By way of example, the temperature associated with the fourteen sensors may indicate an average temperature of 55° F. The temperature associated with the four slightly illuminated or not illuminated sensors may indicate an average temperature of 70° F., the temperature of a table upon which the object 252 is placed. Finally, the two partially illuminated sensors may indicate an average temperature of 62° F. which is a combination of the 55° F. object temperature and the 70° F. table temperature.

The processor 132 in this embodiment is configured to eliminate signals from sensors which diverge from the mode of the signals by a predetermined threshold. Accordingly, the signals from the four slightly illuminated or not illuminated sensors and the signals from the two partially illuminated sensors are eliminated, resulting in a finally selected set of sensors whose signals are used in determining the temperature of the object 252. In some embodiments, the threshold is set such that the signals from one or both of the two partially illuminated sensors is not omitted.

In other embodiments, different algorithms are stored in the memory 134 for use in determining the means by which the signals from the final set of sensors will be used in determining the temperature of a framed object. In one algorithm, sensors located closest to the center of the framed area (FOV) are given a higher weight, while sensors at the fringes of the framed area are given a lower weight. In some embodiments, various smoothing algorithms are incorporated. Accordingly, the relative contribution of the finally selected subset of sensors can be modified if desired.

The algorithms stored in the memory 134 in some embodiments are used to allow the field of view to be adjusted by user input/action/electronically, by addressing different subsets of the array pixels. The field of view in various embodiments is adjustable in the range between 1-120 degrees, preferably between 5-30 degrees.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A portable temperature sensing system comprising:
   a portable housing configured to be carried by a user;
   a microelectrical mechanical system (MEMS) thermal sensor assembly supported by the housing and including an array of thermal sensor elements;
   a memory including program instructions; and
   a processor operably connected to the memory and to the sensor, and configured to execute the program instructions to
      obtain signals from each of a selected set of thermal sensor elements of the array of thermal sensor elements,
      determine an average sensed temperature based upon the signals, and
      render data associated with the determined average sensed temperature.

2. The system of claim 1, wherein the portable housing is a portable cellular telephone housing.

3. The system of claim 1, further comprising:
   an imaging subsystem including a display, the imaging subsystem operably connected to the processor, wherein the processor is further configured to execute the program instructions to render indicia of a field of view of the MEMS thermal sensor assembly using the display.

4. The system of claim 3, wherein:
the selected set of thermal sensor elements is selected based upon a user input; and
the rendered indicia of the field of view is based upon the user input.

5. The system of claim 1, wherein the selected set of thermal sensor elements is selected based upon a comparison of signals from adjacent thermal sensor elements in the array of thermal sensor elements.

6. The of claim 1, wherein the MEMS thermal sensor assembly further comprises:
a cap including a Fresnel lens.

7. The system of claim 6, wherein the Fresnel lens comprises a pattern of doped silicon portions.

8. The system of claim 6, wherein the Fresnel lens is formed on an outer surface of the cap.

9. The system of claim 6, wherein the Fresnel lens is formed on an inner surface of the cap.

10. A portable temperature sensing system comprising:
a portable housing configured to be carried by a user;
a microelectrical mechanical system (MEMS) thermal sensor assembly supported by the housing and including an array of thermal sensor elements;
a memory including program instructions;
a processor operably connected to the memory and to the sensor, and configured to execute the program instructions to
obtain signals from each of a selected set of thermal sensor elements of the array of thermal sensor elements selected based upon a user input,
determine an average sensed temperature based upon the signals, and
render data associated with the determined average sensed temperature; and
an imaging subsystem including a display, the imaging subsystem operably connected to the processor, wherein the processor is further configured to execute the program instructions to render indicia of a field of view of the MEMS thermal sensor assembly using the display, wherein the rendered indicia of the field of view is based upon the user input.

11. The system of claim 10, wherein the portable housing is a portable cellular telephone housing.

12. The system of claim 10, wherein the MEMS thermal sensor assembly further comprises:
a cap including a Fresnel lens comprising a pattern of doped silicon portions.

13. The system of claim 10, wherein the MEMS thermal sensor assembly further comprises:
a cap including a Fresnel lens formed on an outer surface of the cap.

14. The system of claim 10, wherein the MEMS thermal sensor assembly further comprises:
a cap including a Fresnel lens formed on an inner surface of the cap.

15. A portable temperature sensing system, comprising:
a portable housing configured to be carried by a user;
a microelectrical mechanical system (MEMS) thermal sensor assembly supported by the housing and including an array of thermal sensor elements supported by a planar base portion, and a cap including a Fresnel lens, the cap and the base defining a cavity in which the array of thermal sensor elements are located;
a memory including program instructions; and
a processor operably connected to the memory and to the sensor, and configured to execute the program instructions to
obtain signals from each of a selected set of thermal sensor elements of the array of thermal sensor elements,
determine an average sensed temperature based upon the signals, and
render data associated with the determined average sensed temperature.

16. The system of claim 15, wherein the Fresnel lens comprises a pattern of doped silicon portions.

17. The system of claim 15, wherein the Fresnel lens is formed on an outer surface of the cap.

18. The system of claim 15, wherein the Fresnel lens is formed on an inner surface of the cap.

19. The system of claim 15, further comprising:
an imaging subsystem including a display, the imaging subsystem operably connected to the processor, wherein the processor is further configured to execute the program instructions to render indicia of a field of view of the MEMS thermal sensor assembly using the display.

20. The system of claim 19, wherein:
the selected set of thermal sensor elements is selected based upon a user input; and
the rendered indicia of the field of view is based upon the user input.

* * * * *